United States Patent Office 3,741,893
Patented June 26, 1973

3,741,893
FLAME RETARDANT COMPRISING SUPPORTED ANTIMONY TETROXIDE
Rocco L. Mascioli, Media, and Robert G. Petrella, Glenolden, Pa., assignors to Air Products and Chemicals, Inc., Wayne, Pa.
No Drawing. Filed Oct. 8, 1971, Ser. No. 187,847
Int. Cl. C09k 3/28
U.S. Cl. 252—8.1                                    2 Claims

ABSTRACT OF THE DISCLOSURE

A finely divided inorganic oxide carrier powder is impregnated with pure antimony trichloride, and thereafter subjected to hydrolysis in an aqueous system to provide antimony oxide on the carrier particle. Such powder is calcined at 400–1000° C. to provide a supported cervantite. Synthetic resins, both cellular and noncellular, can be made more flame retardant using the supported cervantite in combination with an organic halide. There is a synergistic effect of greater fire retardancy than would result from the additive effects of the inorganic powder and oxide of antimony. Plastic articles containing supported cervantite have an oxygen index of at least 25. Cervantite is the mineral designation for antimony tetroxide of $Sb_2O_4$.

BACKGROUND OF INVENTION

(1) Field of the invention

This invention relates to fire retardant compositions. Certain embodiments are concerned with synthetic resins, comprising both cellular and noncellular, having flame retardancy attributable to the inclusion of the powder comprising supported oxide of antimony in the formulation for the organic plastic article or composition, such formulation also comprising a halogen donor.

(2) Description of the prior art

There is an extremely wide range of variation on the ease of initiating or maintaining combustion of organic materials. An extremely hot high-pressure oxygen jet can maintain combustion of organic material which under the conditions of normal use would be essentially self-extinguishing. For several decades, there have been methods available for imparting significant flame retardancy to tent canvas. Safety engineers have been urging the extension of such concepts of flame retardancy for use in connection with a great variety of products made from organic plastic, both cellular and noncellular. For several decades, the combination of halide content in the organic composition and oxide of antimony have been known to be helpful in flame retardancy for organic articles. There have been significant fluctuations in the price of antimony oxide, thus stimulating fluctuating degrees of interest in using significant amounts of antimony oxide in articles having a controlled degree of flame retardancy.

SUMMARY OF THE INVENTION

In accordance with the present invention, a composition consisting predominantly of a finely divided powder comprising oxides of metal is a carrier for cervantite, that is, antimony tetroxide. Such a supported cervantite may be employed in combination with a halogen donor in the formulation of fire retardant organic materials, both cellular and noncellular having advantageous flame retardancy characteristics. There is a synergistic effect in that the supported cervantite has more powerful flame retardancy effect than the summation of the flame retardancy of an oxide of antimony and a powdered inorganic oxide. X-ray diffraction measurements have confirmed the proof for distinguishing the cervantite or antimony tetroxide of the present invention from the antimony trioxide frequently mentioned in prior art literature pertinent to flame retardancy.

DESCRIPTION OF PREFERRED EMBODIMENTS

The invention is further clarified by reference to a plurality of examples.

Example I

A powdered form of magnesium silicate (Mistron Vapor brand of talc) has a composition as follows: $SiO_2$, 65.21%; $Al_2O_3$, 0.18%; $Fe_2O_3$, 0.99%; CaO, 0.22%; MgO, 30.59%; $Na_2O$, 0.09%; loss on ignition, 4.73%. The particle distribution shows that all particles are less than 10 microns, 98% less than 5 microns, 50.3% less than 1 micron, and 31.9% less than 0.5 micron. The specific gravity of the talc is about 2.75 grams per cc. The surface area is about 20 square meters per gram and the apparent density is about 6 pounds per cubic foot.

300 grams of the talc is dispersed in 2000 grams of deionized water using 6 grams of a suitable surfactant for promoting the dispersion. Antimony trichloride was added to the dispersion by preparing a mixture consisting of 90 grams of deionized water, 71.4 grams of concentrated hydrochloric acid, and 118 grams of antimony trichloride. After the addition of the solution, the mixture was stirred for an additional 10 minutes. Concentrated ammonium hydroxide was added to raise the pH to 9. The precipitate was filtered and washed to remove chloride ion and was then dried at 220° F. The dried powder was transferred to a calciner, and subjected to flue gases at 540° C. for 2 hours. The calcined powder was cooled and tested and shown to contain cervantite. X-ray diffraction established the presence of the antimony tetroxide. The resulting product consisted of about 92% talc and 8.46% antimony tetroxide.

An organic plastic composition was prepared having a formulation as follows:

| | Parts by weight |
|---|---|
| Blendex 211 | 100 |
| Calcium stearate | 1 |
| Dechlorane Plus 515 | 20 |

Blendex 211 is an organic resin, a terpolymer of acrylonitrile, butadiene, and styrene (ABS plastic) marketed by the Marbon division of Borg Warner. Dechlorane Plus 515 is a solid organic chloride containing 65% chlorine, having a melting point above 350° C., resembling the polymer from the Diels-Alder addition of butadiene and hexachloropentadiene, marketed by Hooker Chemical Company.

As one control for evaluating and comparing the present invention, a control composition was prepared using such components and 12 parts of antimony trioxide. A sample article is molded from such control composition. The article exhibits an oxygen index of 25 when tested by the oxygen index test.

In the example of the invention, 12 parts of the talc containing 8.46% antimony tetroxide were combined with the standard formulation to produce a composition which was molded into articles which are sufficiently flame retardant that in the oxygen index test, an article will continue to burn only if the oxygen concentration is 28%. The oxygen index was higher than in the control which required about twelve times as much antimony.

Example II

Kaolin is calcined to form a meta kaolin having a specific gravity of about 2.63 grams per milliliter, an average particle size of about 1.4 microns, 100% less than 10 microns and 50% of the weight of the particles of a size smaller than 2 microns and having a residue of not more than about 0.35 weight percent on the 325 mesh screen. A dispersion of 3500 grams of deionized water and 500 grams of said meta kaolin was prepared using 5 grams of a surfactant for promoting the dispersion. During a 3 hour period, there was dropwise addition of a mixture consisting of 251 grams of deionized water, 262 grams of concentrated hydrochloric acid and 336 g. of antimony trichloride. The mixing was continued for 10 minutes to assure the impregnation of the antimony compound into the particles of meta kaolin. Sufficient concentrated ammonium hydroxide was added to raise the pH to 9 and stirring of the dispersion was continued. The next morning the product was filtered and washed with sufficient water to provide an effluent from the washing which was free from chloride by the silver nitrate test. The filter cake was placed in an oven maintained at 540° C. for the calcination period. During calcination, the antimony compound was converted to antimony tetroxide sometimes called cervantite. This was established by X-ray diffraction. The product contained 14.8% antimony tetroxide.

A resin blend was prepared consisting of: Blendex 211 type of resin, 100 parts by weight; calcium stearate, 1 part by weight; Dechlorane Plus 515, 20 parts by weight; and the supported cervantite consisting of 14.8% $Sb_2O_4$ on meta kaolin, 15 parts by weight. The article molded from such composition was resistant to flame propagation, so that it had an oxygen index of 28, comfortably above the 25 oxygen index indicative of sufficient flame retardancy to be of commercial interest.

Example III

The supported cervantite on talc of Example I was employed in a series of tests to evaluate the significance of the impregnation step. A blend consisting of Blendex 211 type of ABS resin, calcium stearate, 1 part by weight, Dechlorane Plus 515, 30 parts by weight, talc supported cervantite, 15 parts by weight. The sample of talc supported cervantite contained 9.39% of antimony tetroxide. An article molded from such composition had an oxygen index of 27.

A control composition consisting of 13.5 parts by weight of meta kaolin and 1.5 parts by weight of antimony trioxide permitted preparation of plastic articles which had an oxygen index of 25. Thus the supported cervantite of the present invention is significantly better than what would be the additive result of using the inorganic metal powder as the carrier plus the effect of the use of a conventional oxide of antimony.

Example IV

An aqueous acidic solution of antimony trichloride was dripped into a stirred dispersion of 200 grams of talc in 1500 milliliters of deionized water to impregnate the 28 grams of antimony trichloride into the 200 grams of talc. Thereafter, the dispersion was converted to an alkaline system having a pH of 9 by the addition of concentrated ammonium hydroxide. The precipitate was separated on a filter, washed free from chloride, and divided into 2 parts. Each part was transferred as a wet cake to an oven for treatment at 540° C. Sample A was thus treated for 1 hour and Sample B for 4 hours. The prolonged teratment led to a volatilization of a portion of the antimony compound so that Sample A contained 9.95% antimony tetroxide and the Sample B contained only 9.27% antimony tetroxide.

The flame retardancy of each of the two batches of talc supported cervantite was evaluated by preparing a composition characterized as a polyvinyl chloride plastic. The composition was: Escambia polyvinyl chloride 1255, 64.5 parts by weight; dioctyl phthalate plasticizer, 32.3 parts by weight; barium-cadmium stabilizer, 1.9 parts by weight; epoxidized soy bean oil, 1.3 weight percent.

A control plastic article prepared from such resin had a rating of 27 in the oxygen index test, attributable in part to the chloride content of the PVC.

The precursor composition was modified by the addition of 5 parts of the talc supported cervantite (Part A) containing 9.95% antimony tetroxide. The oxygen index was 33. Similarly the article made from the precursor containing 5 parts by weight of Part B had an oxygen index of 33.

A precursor resin mixture was prepared consisting of:

| | Parts by weight |
|---|---|
| ABS resin (Blendex 211) | 100 |
| Chlormated organic (Dechlorane Plus 515) | 30 |
| Calcium stearate | 1 |

An article molded therefrom had an oxygen index of 23. Inclusion of 13.3 parts of Part B (calcined for 4 hours) in the precursor imparted to the article an oxygen index of 29. Even better flame retardancy was attained using 13.3 parts of Part A (calcined for 1 hour), leading to an oxygen index of 30.

A precursor resin mixture was prepared consisting of:

| | Parts by weight |
|---|---|
| Polypropylene (Profax 6523E) | 100 |
| Chlorinated wax (Chlorowax 70) | 8 |
| Calcium stearate | 1 |

The oxygen index for an article made from such precursor was 19. An article using 3 parts of Part A flame retardant had an oxygen index of 28, and the same result was noted using the same amount of Part B flame retardant.

Examples V–VII

Antimony trichloride was dissolved in concentrated hydrochloric acid solution. A slurry of inorganic powder in water was vigorously agitated during the dropwise addition of the aqueous acidic solution of antimony trichloride. The antimony compound tended to be adsorbed onto the particles of the inorganic component. After the addition of the controlled amount of antimony chloride, the agitation was continued during the addition of concentrated ammonium hydroxide whereby the pH of the dispersion was raised to about pH 8.5 as measured by pH paper. The slurry was filtered and washed with deionized water until free from any trace of chloride ion. The material was dried at about 225° F. for several hours and thereafter was calcined at 540° C. to provide $Sb_2O_4$ on an inorganic powder.

In preparation A, the inorganic powder was raw kaolin clay and after calcining, the product contained 21.52% antimony tetroxide. Preparation B consisted of 25.0% antimony tetroxide on powdered talc. Preparation C consisted of 15.4% antimony tetroxide on raw kaolin. Preparation D consisted of 25.07% antimony tetroxide on talc.

Several flame retardant plastic compositions were prepared which differed as regards the flame retardant component. The general formulation to each of the compositions included 150 parts of general purpose grade of polypropylene resin such as Profax 6523 marketed by Hercules. A chlorinated organic material containing about 70% chlorine and having a molecular weight of about 1000, conveniently called a chlorinated paraffin is used in an amount of about 10 parts. An example of chlorinated paraffin has the following physical properties:

| | |
|---|---|
| Specific gravity | 1.65 |
| Chlorine content percent | 70 |
| Refractive indices index at 250° | 1.535 |
| Molecular weight | 1060 |
| Color—cream white. | |

Calcium stearate was included in the composition as a lubricant and was present in an amount of 1.0 part. It can be noted that each plastic sample consisted of:

| | |
|---|---:|
| Polypropylene | 150.0 |
| Chlorinated paraffin | 10.0 |
| Calcium stearate | 1.5 |
| Flame retardant powder | 0–20 |

Each plastic sample was subjected to an oxygen index value test to measure its flame retardancy and to an impact test for measuring whatever impairment of strength was attributable to the flame retardant powder. It is desirable to retain an acceptable impact resistance notwithstanding the propensity for the presence of the powder to weaken the sample.

Control composition E contained no flame retardant, and had an oxygen index value of 20. The impact test for this composition showed 0.63 foot pounds per inch of notch. Sample F was also a control and contained 5 parts of antimony trioxide corresponding to 3.33% antimony trioxide based upon the polypropylene. Such control had an oxygen index value of 26 and an impact value of 0.55. The chlorinated paraffin imparted some flame retardancy to the composition.

Controls G and H featured the same flame retardant, which was a silica-supported antimony trioxide available commercially. It consisted of about equal amounts of $SiO_2$ and $Sb_2O_3$. Such silica-supported antimony trioxide was present in a concentration of 10 parts per 150 parts polypropylene in Control G, that is 3.3% antimony trioxide. The oxygen index value for Control G was 24. The impact test showed 0.47 foot pound per inch of notch.

Control H resembled Control G except that the quantity of the silica-supported antimony oxide was twice as great or 20 parts per 150 parts of polypropylene, providing 6.7% antimony trioxide. Control H was found to have an oxygen index value of 28 and an impact value of 0.48.

Controls J and K utilized a flame retardant containing about 25% antimony trioxide, having a specific gravity of about 3.3 and about 75% inorganic oxide matrix. In Control J, 10 parts of such flame retardant, or 1.67% antimony trioxide were used, and the composition was found to have an oxygen index value of 25 and an impact value of 0.44. Control K utilized 20 parts of said flame retardant, providing 3.33% antimony trioxide. Control K had an oxygen index value of 28 and an impact value of 0.51 foot pound per inch of notch.

In Example V, 10 parts of A (i.e. 21.5% $Sb_2O_4$ on kaolin) were utilized as a fire retardant and the composition contained 1.43% antimony tetroxide. The oxygen index value was 28 and the impact value was 0.48 foot pounds per inch of notch. In Example VI, 5 parts of B (25% $Sb_2O_4$ on talc) were employed corresponding to 0.83% antimony tetroxide. The oxygen index value was 27 and the impact test corresponded to 0.43. Example VII utilized 10 parts, instead of 5 parts of component B (25% $Sb_2O_4$ on talc). Thus, it had 1.67% antimony tetroxide. The oxygen index value was 28 and the impact value was 0.41. The results are set forth in Table 1.

It should be noted that the oxygen index values obtained with Examples V, VI, and VII are superior to the corresponding values of Control J (1.67% $Sb_2O_3$) Control F (3.3% $Sb_2O_3$) and Control G (3.3% $Sb_2O_3$). Antimony compounds are relatively costly components, and by using prior art compositions in quantities large enough to provide 6.7% $Sb_2O_3$ (as in Control H) or 3.33% $Sb_2O_3$ (as in Control K) the oxygen index values of the present invention were matched. It should be noted that the products of Examples V–VII had impact values within the satisfactory range, as were all of the controls.

Examples VIII–XI

Several plastic compositions were prepared and tested similarly to Examples V–VII, but substituting acrylonitrile-butadiene-styrene terpolymer for the polypropylene. An ABS (i.e. acrylonitrile-butadiene-polystyrene) terpolymer resin such as Blendex 211 may be employed.

A highly chlorinated organic material contains 65% chlorine, remains a solid at 350° C., and has a density of 1.80 g./ml. One example of such a highly chlorinated solid is marketed as Dichlorane Plus 515.

A general formula for several preparations was:

| | |
|---|---:|
| ABS terpolymer | 150 |
| Highly chlorinated material | 45 |
| Calcium stearate | 1.5 |
| Flame retardant agent | 10–20 |

The several preparations are summarized in Table 2. As regards selection of control flame retardants, the controls resemble the controls of Table 1, but differ as regards the resin formulation.

TABLE 2

| | F | J | K | 8 | 9 | 10 | 11 |
|---|---|---|---|---|---|---|---|
| ABS resin | | | | | | | 150 |
| Calcium stearate | | | | | | | 1.5 |
| Highly chlorinated material | | | | | | | 45.0 |
| Antimony trioxide | 10 | | | | | | |
| 25% $Sb_2O_3$ on matrix | | 10 | 20 | | | | |
| C, 15.4% $Sb_2O_4$ on kaolin | | | | 10 | 20 | | |
| B, 25% $Sb_2O_4$ on talc | | | | | | 10 | 20 |
| Oxygen index | 33 | 26 | 30 | 2.6 | 33 | 29.5 | 30 |
| Izod impact | 0.50 | 0.45 | 0.52 | 0.511 | 0.51 | 0.46 | 0.36 |

Examples XII–XIV

Preparations resembling Examples V–VII were developed using 4.5 parts of the selected flame retardant agents, as shown in Table 3.

TABLE 3

| | E | F | J | 12 | 13 | 14 |
|---|---|---|---|---|---|---|
| Polypropylene | | | | | | 150 |
| Chlorinated paraffin | | | | | | 12 |
| Calcium stearate | | | | | | 1.5 |
| Antimony trioxide | | 4.5 | | | | |
| 25% $Sb_2O_3$ on matrix | | | 4.5 | | | |
| A, 21.52% $Sb_2O_4$ on kaolin | | | | 4.5 | | |
| B, 25% $Sb_2O_4$ on talc | | | | | 4.5 | |
| C, 15.4% $Sb_2O_4$ on kaolin | | | | | | 4.5 |
| Oxygen index | 21 | 26 | 28 | 26 | 27 | 26 |
| Izod impact, ft. lbs./in. of notch | 0.22 | 0.20 | 0.18 | 0.19 | 0.19 | 0.13 |

TABLE 1

| | Controls | | | | | | Examples | | |
|---|---|---|---|---|---|---|---|---|---|
| | E | F | G | H | J | K | 5 | 6 | 7 |
| Polypropylene | | | | | | | | | 150 |
| Chlorowax | | | | | | | | | 10 |
| Calcium stearate | | | | | | | | | 1.5 |
| Antimony trioxide | | 5 | | | | | | | |
| $Sb_2O_3$-$SiO_2$ | | | 10 | 20 | | | | | |
| 25% $Sb_2O_3$ on matrix | | | | | 10 | 20 | | | |
| A, 21.52 $Sb_2O_4$ on kaolin | | | | | | | 10 | | |
| B, 25% $Sb_2O_4$ on talc | | | | | | | | 5 | 10 |
| Oxygen index value | 20 | 26 | 24 | 28 | 25 | 28 | 28 | 27 | 28 |
| Izod impact, ft. lbs/in. of notch | 0.63 | 0.55 | 0.47 | 0.48 | 0.44 | 0.51 | 0.48 | 0.43 | 0–41 |

Examples XV-XVIII

Polyvinyl chloride resin was employed in a series of preparations following the general formula:

| | |
|---|---|
| PVC resin | 96.9 |
| Dioctyl phthalate | 48.3 |
| Zinc-cadmium stabilizer (Ferrol 720) | 2.9 |
| Epoxidized soybean plasticizer (Paraplex G–62) | 1.9 |
| Flame retardant agent | 0–6 |

As shown in Table 4, the flame retardant characteristics of the plastic compositions were within the acceptable range. The sample of $Sb_2O_4$ on kaolin was calcined at conditions tending selectively to volatilize $Sb_2O_4$ therefrom, producing products as follows:

| | Hours | Temp. (° C.) | Percent |
|---|---|---|---|
| P | 10 | 300 | 29.77 |
| Q | 10 | 400 | 27.05 |
| R | 4 | 700 | 18.70 |
| S | 4 | 1,000 | 15.46 |

The data of Table 4 establish that the flame retardant agents of the present invention have high effectiveness for PVC resins. The PVC contains enough chlorine that it is not necessary to incorporate one of the highly chlorinated organic materials of other examples into the precursor for Examples IX-XII.

TABLE 4

| | E | F | G | J | 15 | 16 | 17 | 18 |
|---|---|---|---|---|---|---|---|---|
| PVC | 98.9 | | | | | | | |
| Dioctyl phthalate | 48.3 | | | | | | | |
| Stabilizer | 2.9 | | | | | | | |
| Supp. Plas | 1.9 | | | | | | | |
| Antimony trioxide | | 6 | | | | | | |
| $Sb_2O_3$-$SiO_2$ | | | 6 | | | | | |
| 25% $Sb_2O_3$ on matrix | | | | 6 | | | | |
| P, 29.77% $Sb_2O_4$ on kaolin | | | | | 6 | | | |
| Q, 27.05% $Sb_2O_4$ on kaolin | | | | | | 6 | | |
| R, 18.7% $Sb_2O_4$ on kaolin | | | | | | | 6 | |
| S, 15.46% $Sb_2O_4$ on kaolin | | | | | | | | 6 |
| Oxygen index | 26 | 35.3 | 32.6 | 32.3 | 31.6 | 30.6 | 32 | 32.3 |

By a series of tests it is established that: meta kaolin and talc are the preferred inorganic oxides for the matrix into which the antimony trichloride is impregnated; the ammonium hydroxide is added to the aqueous acidic dispersion to adjust the pH to at least 8.5 pH; the filter cake resulting from the filtration of the reaction product of the ammonium hydroxide and impregnated inorganic oxide dispersion is washed until free from chloride ion; the filter cake is calcined in the presence of an oxygen containing gas at 400-800° C. to form $Sb_2O_4$ in the inorganic oxide matrix; the calcined powder is cooled to provide the advantageous flame retardant powder of the present invention; the concentration of the flame retardant powder should be within the range from 3 to 20 weight percent of the plastic article, corresponding approximately to about 5 to 25 parts per 100 parts of resin, there being various modifiers in the resin composition which is converted to the plastic article by some conventional method such as extrusion, molding, casting, etc.; the weight of organic halide in the resin composition is desirably greater than the weight of antimony in such composition inasmuch as the organic halide and antimony cooperate in enhancing fire retardancy; the concentration of antimony in the flame retardant powder, expressed as antimony tetroxide, must be within the range from 5 to 30 weight percent and desirably is from 7 to 15%; and the oxygen index of the plastic article containing the flame retardant powder of the present invention is consistently synergistically superior to the oxygen index of a similarly prepared article having the same antimony content and same inorganic oxide content resulting from the incorporation separately of antimony trioxide as a component and talc or meta kaolin as a component.

The invention claimed is:

1. A flame retardant powder consisting of antimony tetroxide distributed throughout a matrix which consists of inorganic oxides selected from the group consisting of meta kaolin and talc.

2. The method of preparing the flame retardant of claim 1 which comprises the steps of:

impregnating an aqueous acidic dispersion of a matrix selected from the group consisting of meta kaolin and talc with antimony trichloride, thereafter adjusting the pH of the dispersion to at least 8.5 pH by the addition of ammonium hydroxide, filtering the dispersion, washing the filter cake free from chloride ion, calcining the washed filter cake in an oxygen containing gas at a temperature within the range from 400° to 800° C., and cooling the thus calcined powder to provide antimony tetroxide distributed throughout the matrix.

References Cited

UNITED STATES PATENTS

| | | | |
|---|---|---|---|
| 3,560,441 | 2/1971 | Schwarcz et al. | 260—45.75 |
| 3,660,321 | 5/1972 | Praetzel et al. | 260—2.5 FP |
| 3,591,507 | 7/1971 | Drake et al. | 252—8.1 |
| 3,553,132 | 1/1971 | Dunay et al. | 252—62 |

GEORGE F. LESMES, Primary Examiner

W. R. DIXON, Jr., Assistant Examiner

U.S. Cl. X.R.

106—15 FP; 260—45.7 R, DIG. 24